US011204772B2

(12) United States Patent
Silberman et al.

(10) Patent No.: US 11,204,772 B2
(45) Date of Patent: *Dec. 21, 2021

(54) COALESCING GLOBAL COMPLETION TABLE ENTRIES IN AN OUT-OF-ORDER PROCESSOR

(71) Applicant: International Business Machines Corporation, Armonk, NY (US)

(72) Inventors: Joel A. Silberman, Somers, NY (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 143 days.

This patent is subject to a terminal disclaimer.

(21) Appl. No.: 16/738,360

(22) Filed: Jan. 9, 2020

(65) Prior Publication Data

US 2020/0150969 A1 May 14, 2020

Related U.S. Application Data

(63) Continuation of application No. 15/826,752, filed on Nov. 30, 2017, now Pat. No. 10,564,979.

(51) Int. Cl.
*G06F 9/30* (2018.01)
*G06F 9/38* (2018.01)

(52) U.S. Cl.
CPC .......... *G06F 9/3855* (2013.01); *G06F 9/3867* (2013.01)

(58) Field of Classification Search
None
See application file for complete search history.

(56) References Cited

U.S. PATENT DOCUMENTS

| 5,655,096 A | 8/1997 | Branigin |
| 5,689,674 A | 11/1997 | Griffith et al. |

(Continued)

FOREIGN PATENT DOCUMENTS

| CN | 101034345 A | 9/2007 |
| CN | 102360309 A | 2/2012 |

OTHER PUBLICATIONS

Akkary et al., "Checkpoint processing and recovery: Towards scalable large instruction window processors." Microarchitecture, 2003. MICRO-36. Proceedings. 36th Annual IEEE/ACM International Symposium on. IEEE, 2003, 12 pages.

(Continued)

*Primary Examiner* — Corey S Faherty
(74) *Attorney, Agent, or Firm* — Cantor Colburn LLP; Teddi Maranzano

(57) ABSTRACT

Aspects of the invention include detecting that all instructions in a first group of in-flight instructions have a status of finished. The first group of in-flight instructions is associated with a first allocated entry in a global completion table (GCT) which tracks a dispatch order and status of groups of in-flight instructions. The GCT includes a plurality of allocated entries including the first allocated entry and a second allocated entry. A second group of in-flight instructions dispatched immediately prior to the first group is associated with the second allocated entry in the GCT. Based at least in part on the detecting, the first allocated entry is merged into the second allocated entry to create a single merged second allocated entry in the GCT that includes completion information for both the first group of in-flight instructions and the second group of in-flight instructions. The first allocated entry is then deallocated.

20 Claims, 7 Drawing Sheets

(56) References Cited

U.S. PATENT DOCUMENTS

| | | | |
|---|---|---|---|
| 5,710,902 | A | 1/1998 | Sheaffer et al. |
| 6,065,105 | A | 5/2000 | Zaidi |
| 6,336,183 | B1 | 1/2002 | Le et al. |
| 6,425,074 | B1 | 6/2002 | Meier et al. |
| 6,463,523 | B1 | 10/2002 | Kessler et al. |
| 6,553,480 | B1 | 4/2003 | Cheong |
| 6,557,095 | B1 | 4/2003 | Henstrom |
| 6,721,874 | B1 | 4/2004 | Le et al. |
| 6,728,866 | B1 | 4/2004 | Kahle et al. |
| RE38,599 | E | 9/2004 | Tremblay |
| 6,862,676 | B1 | 3/2005 | Knapp et al. |
| 6,931,639 | B1 | 8/2005 | Eickemeyer |
| 6,988,183 | B1 | 1/2006 | Wong |
| 6,988,186 | B2 | 1/2006 | Eickemeyer et al. |
| 7,133,925 | B2 | 11/2006 | Mukherjee et al. |
| 7,219,249 | B1 | 5/2007 | Ghose |
| 7,464,253 | B2 | 12/2008 | Veidenbaum et al. |
| 7,472,258 | B2 | 12/2008 | Burky |
| 7,689,812 | B2 | 3/2010 | Abernathy et al. |
| 8,127,116 | B2 | 2/2012 | Islam et al. |
| 8,285,974 | B2 | 10/2012 | Singh et al. |
| 8,392,672 | B1 | 3/2013 | Rhoades et al. |
| 8,521,998 | B2 | 8/2013 | Albernathy et al. |
| 8,667,260 | B2 | 3/2014 | Eichenberger et al. |
| 8,930,432 | B2 | 1/2015 | Hickey et al. |
| 9,047,079 | B2 | 6/2015 | Bruce et al. |
| 9,058,180 | B2 | 6/2015 | Golla et al. |
| 9,146,774 | B2 | 9/2015 | Busaba et al. |
| 9,158,573 | B2 | 10/2015 | Busaba et al. |
| 9,298,466 | B2 | 3/2016 | Buyuktosunoglu et al. |
| 9,489,207 | B2 | 11/2016 | Burky et al. |
| 9,513,924 | B2 | 12/2016 | Gschwind et al. |
| 9,619,383 | B2 | 4/2017 | Busaba et al. |
| 2002/0053038 | A1 | 5/2002 | Buyukosunoglu et al. |
| 2003/0069920 | A1 | 4/2003 | Melvin et al. |
| 2004/0177239 | A1 | 9/2004 | Clift et al. |
| 2004/0210743 | A1 | 10/2004 | Burky et al. |
| 2004/0215938 | A1 | 10/2004 | Burky |
| 2005/0038979 | A1 | 2/2005 | Fischer et al. |
| 2005/0243734 | A1 | 11/2005 | Nemirovsky et al. |
| 2006/0095732 | A1 | 5/2006 | Tran |
| 2009/0100249 | A1 | 4/2009 | Eichenberger et al. |
| 2009/0113181 | A1 | 4/2009 | Comparan et al. |
| 2009/0276608 | A1 | 11/2009 | Shimada |
| 2010/0095087 | A1 | 4/2010 | Eichenberger et al. |
| 2010/0161942 | A1 | 6/2010 | Bishop |
| 2010/0262806 | A1 | 10/2010 | Doing |
| 2011/0153986 | A1 | 6/2011 | Alexander et al. |
| 2011/0302392 | A1 | 12/2011 | Abernathy et al. |
| 2012/0233441 | A1 | 9/2012 | Barren |
| 2013/0205118 | A1 | 8/2013 | Buyuktosunoglu et al. |
| 2014/0351562 | A1 | 11/2014 | Spadini |
| 2015/0106595 | A1 | 4/2015 | Khot et al. |
| 2015/0220342 | A1 | 8/2015 | Glossner |
| 2016/0117172 | A1 | 4/2016 | Alexander et al. |
| 2016/0202988 | A1 | 7/2016 | Ayub et al. |
| 2017/0132010 | A1 | 5/2017 | Vasekin et al. |
| 2017/0235577 | A1 | 8/2017 | Brownscheidle |
| 2017/0344374 | A1 | 11/2017 | Friedmann |
| 2018/0232234 | A1 | 8/2018 | Alexander |
| 2019/0163482 | A1 | 5/2019 | Silberman |
| 2019/0163483 | A1 | 5/2019 | Silberman |
| 2019/0163484 | A1 | 5/2019 | Silberman |
| 2019/0163485 | A1 | 5/2019 | Karve |
| 2019/0163486 | A1 | 5/2019 | Sinharoy |
| 2019/0163488 | A1 | 5/2019 | Karve |
| 2019/0163489 | A1 | 5/2019 | Karve |
| 2019/0163490 | A1 | 5/2019 | Silberman |
| 2019/0163491 | A1 | 5/2019 | Silberman |

OTHER PUBLICATIONS

Alastruey et al. "Selection of the Register File Size and the Resource Allocation Policy on SMT Processors." Computer Architecture and High Performance Computing, 2008. SBAC-PAD'08. 20th International Symposium on. IEEE, 2008, 8 pages.

Anonymously; "An extensible, scalable, optimized multithreaded data loading framework for software applications";http://ip.com/IPCOM/000240374D; Jan. 28, 2015, 8 pages.

Anonymously; "Method and Apparatus for Hardware Assisted Function Shipping"; http://ip.com/IPCOM/000199436D; Sep. 3, 2010, 7 pages.

Anonymously; "System of Programmable Mode Control within an Instruction Sequencing Unit for Management of Power within a Microprocessor"; http://ip.com/IPCOM/000217762D; May 11, 2012, 2 pages.

Anonymously; "VSU/FXU Powergating"; http://ip.com/IPCOM/000216899D; Apr. 23, 2012, 2 pages.

Daniele Folegnani et al., "Energy Effective Issue Logic" ISCA '01, Proceedings of the 28th annual international symposium on Computer architechture, pp. 230-239 (Year:2001).

Duong et al., "Compiler Assisted Out-Of-Order Instruction Commit." Center for Embedded Computer Systems, University of California, Irvine (2010), 27 pages.

Ergin et al. "Increasing processor performance through early register release." Computer Design: VLSI in Computers and Processors, 2004. ICCD 2004. Proceedings. IEEE International Conference on. IEEE, 2004, 8 pages.

Herlihy et al., . Transactional memory: Architectural support for lock-free data structures. vol. 21. No. 2. ACM, 1993, 41 pages.

IBM; "Instruction Steering Policy for Balanced Utilization of a Biburcated Unified Issue Queue"; http://ip.com/IPCOM/000179961D; Mar. 3, 2009, 3 pages.

International Search Report and Written Opinion for International Application No. PCT/IB2018/058800; International Filing Date: Nov. 9, 2018; dated Feb. 27, 2019, 9 pages.

International Search Report and Written Opinion for International Application No. PCT/IB2018/058801, International Filing Date: Nov. 9, 2018; dated Jan. 21, 2019, 9 pages.

International Search Report/Written Opinion for International Application No. PCT/IB2018/058799, International Filing Date: Nov. 9, 2018; dated Feb. 12, 2019, 9 pages.

Koufaty et al., "Hyperthreading technology in the netburst microarchitecture." IEEE Micro 23.2 (2003): pp. 56-65.

List of IBM Patents or Patent Applictions Treated as Related; (Appendix P), Filed Jan. 9, 2020.

Martinez et al. "Cherry: Checkpointed early resource recycling in out-of-order microprocessors." Microarchitecture, 2002.(MICRO-35). Proceedings. 35th Annual IEEE/ACM International Symposium on. IEEE, 2002, 12 pages.

Mericas, A.; "Performance Characteristics of the POWER8 Processor"; IBM Corporation, IBM Systems & Technology Group Development; 2014, 26 pages.

Ramírez et al., "Direct Instruction Wakeup for Out-Of-Order Processors," Proc Innovative Architecture for Future Generation High-Performance Processors and Systems, IEEE, 2004, 8 Pages.

Shum et al., "IBM zEC12: The third-generation high-frequency mainframe microprocessor." Ieee Micro 33.2 (2013): pp. 38-47.

Subramaniam et al., "Store Vectors for Scalable Memory Dependence Prediction and Scheduling," Proc of the 12th Intl Symp on High-Performance Computer Architecture, IEEE, 2006, 12 pages.

Tendler, JM. et al.; "POWER4 System microarchitecture"; IBM Corporation, IBM Research & Development; vol. 46, No. 1; Jan. 2002, 21 pages.

European Office Action dated Aug. 17, 2021, File No. 11 2018 006 124.8, 14 pages.

Mutlu, Onur: 18-447: Computer Architecture, Lecture 13: Out-of-Order Execution, Carnegie Mellon University, Feb. 29, 2012. Url: https://pdfs.semanticscholar.org/07a6/6e0f2777bb0005384defd228d5aa0bd7f9a4.pdf [accessed on Aug. 16, 2021] 65 pages.

POWER4. In: Wikipedia, the free encyclopedia. Processing status: Jun. 5, 2016.,URL: https://en.wikipedia.org/w/index.php?title=POWER4&oldid=723726144 [accessed on Aug. 16, 2021] 4 pages.

(56) References Cited

OTHER PUBLICATIONS

POWER5. In: Wikipedia, the free encyclopedia. Processing status: Aug. 10, 2017., URL: https://en.wikipedia.org/w/index.php?title=POWER5&oldid=794823602 accessed on Aug. 16, 2021] 4 pages.

COALESCING GLOBAL COMPLETION TABLE ENTRIES IN AN OUT-OF-ORDER PROCESSOR

DOMESTIC PRIORITY

This application is a continuation of U.S. patent application Ser. No. 15/826,752, filed Nov. 30, 2017, the content of which is incorporated by reference herein in its entirety.

BACKGROUND

Embodiments of the present invention relate in general to an out-of-order (OoO) processor and more specifically to coalescing global completion table (GCT) entries in an OoO processor.

In an OoO processor, an instruction sequencing unit (ISU) dispatches instructions in groups to various issue queues, renames registers in support of OoO execution, issues instructions from the various issue queues to the execution pipelines, completes executed instructions, and handles exception conditions. Register renaming is typically performed by mapper logic in the ISU before the instructions are placed in their respective issue queues. Dependencies between instructions are tracked using dependency matrices that are located in the issue queues of the ISU, and a GCT in the ISU tracks all in-flight instructions from dispatch to completion.

SUMMARY

Embodiments of the present invention include methods, systems, and computer program products for coalescing global completion table (GCT) entries in an OoO processor. A non-limiting example of the computer-implemented method includes detecting, in an instruction sequencing unit (ISU) of the OoO processor, that all instructions in a first group of in-flight instructions have a status of finished. The first group of in-flight instructions is associated with a first allocated entry in the GCT which tracks a dispatch order and status of groups of in-flight instructions. The GCT includes a plurality of allocated entries including the first allocated entry and a second allocated entry. A second group of in-flight instructions dispatched immediately prior to the first group is associated with a second allocated entry in the GCT. Based at least in part on the detecting, the first allocated entry is merged into the second allocated entry to create a single merged second allocated entry in the GCT that includes completion information for both the first group of in-flight instructions and the second group of in-flight instructions. Subsequent to the merging, the first allocated entry in the GCT is deallocated for use by a new group of in-flight instructions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
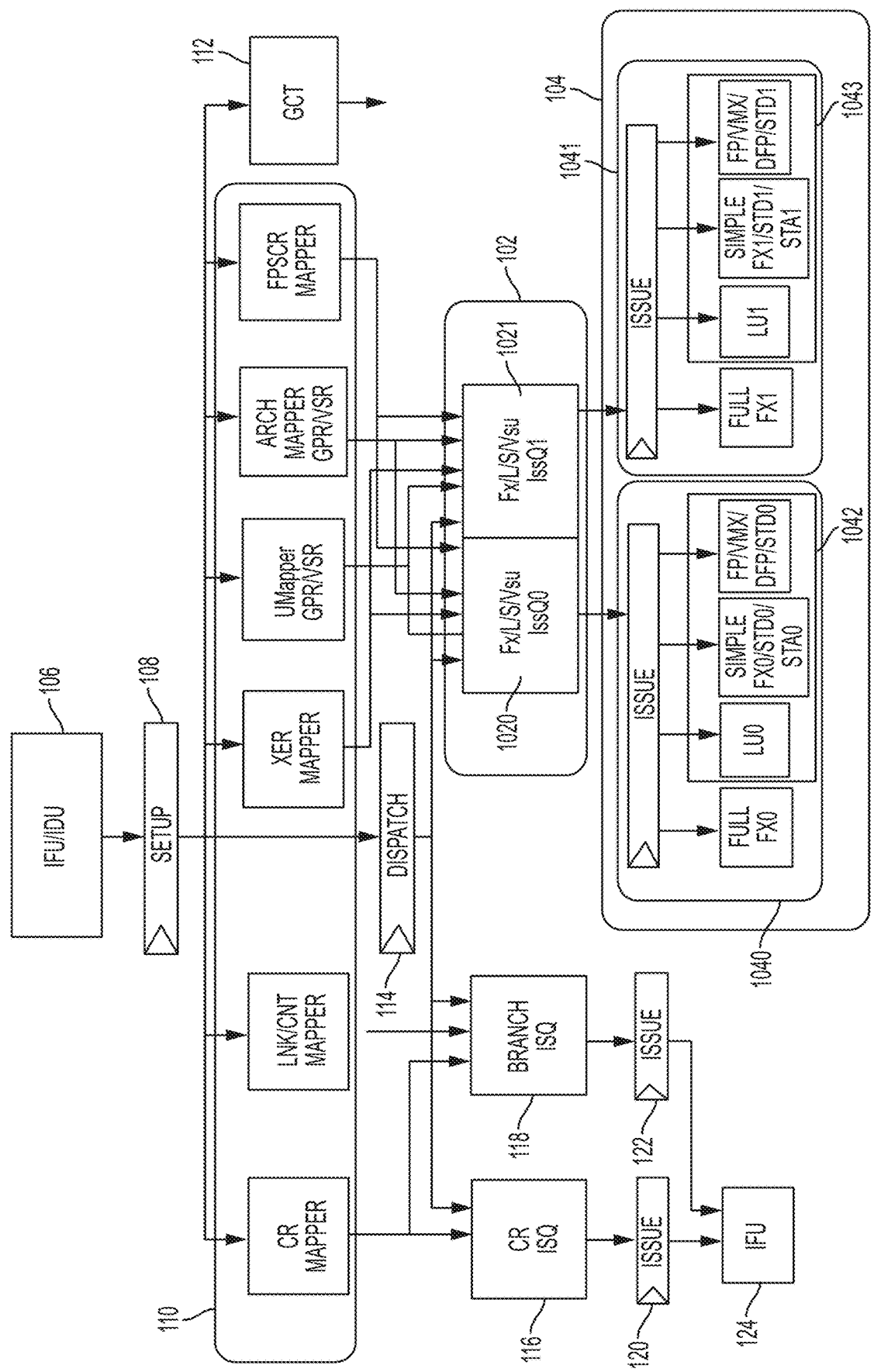
FIG. 1 depicts a block diagram of a system that includes an instruction sequencing unit (ISU) of an out-of-order (OoO) processor for providing coalesced global completion table (GCT) entries in the OoO processor in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

One or more embodiments of the present invention described herein provide coalesced entries in a global completion table (GCT) of an out-of-order (OoO) processor. The coalesced entries are created by combining, or merging, multiple entries in the GCT into a single GCT entry. When all of the instructions in the groups corresponding to the merged GCT entry are finished and the merged entry eligible for completion (for example, next to complete), all of the groups in the merged entry are completed at the same time as a single unit. The merging of groups into a single entry in the GCT frees up space in the GCT for use by other groups of instructions, and can alleviate bottlenecks caused by the size of the GCT and long running instruction groups.

The GCT in an instruction sequencing unit (ISU) of an OoO processor tracks all in-flight instructions from dispatch to completion. At dispatch, finish bits in a group of instructions are set to reflect the valid instructions in the group. When an instruction has executed successfully (e.g., without a reject) it can be marked as finished by resetting the corresponding finish bit. When all of the instructions in a group are marked as finished and the group is the oldest for a given thread, the group can "complete." When a group completes, the results of all its instructions are made architecturally visible and the resources held by its instructions are released.

In accordance with one or more embodiments of the present invention flush generation is also handled by the ISU, with the GCT combining flushes for all groups to be discarded into a mask with one bit for each group to indicate which groups should be flushed. The GCT can also perform partial group flushes by using a mask with one bit for each instruction in a group to indicate which instructions within a group should be flushed.

As described herein, one or more embodiments of the present invention combine GCT entries to free up space, or entries, in the GCT for additional groups of instructions. In accordance with one or more embodiments of the present invention, two entries can be combined when an older group is not ready to be completed but a younger group is ready to be completed (e.g., all instructions in the group have finished with no trouble/interrupt bits). In this case, information from the younger entry (corresponds to the younger group of instructions) in the GCT can be combined into the older entry (corresponds to the older group of instructions) in the GCT and the younger entry in the GCT can be freed up for use by another group of instructions. Additional younger entries can continue to be combined with the older entry (which may be the oldest entry in the GCT) while the older entry is stuck. The older group is stuck when one or more instructions in the group represented by, or associated with, the older entry have not finished and the group cannot be completed.

When the older group eventually completes it frees up load reorder queue (LRQ) entries, store reorder queue (SRQ) entries, effective address table (EAT) entries, and other resources for all of the groups combined, or merged, into the older GCT entry. This allows GCT entries associated with younger groups of instructions to be freed up (deallocated) and reused (reallocated) without having to wait for a longer running instruction(s) associated with the older group to complete. This can lead to a reduction in the occurrence of dispatch hold caused by the GCT being a bottleneck due to a lack of available GCT entries by freeing up resources more quickly.

As used herein, the term "younger group" refers to a group of instructions that were dispatched more recently, or after, a group of instructions in an "older group." As used herein, the terms "immediately subsequent group" or "next younger group" refers to the first group of instructions that were dispatched after a specified group of instructions were dispatched. The terms "immediately prior group" or "next older group" as used herein refer to the group of instructions that were dispatched immediately prior to a specified group of instructions being dispatched. As used herein, the term "oldest group" refers to the group of instructions in the ISU with the earliest dispatch time, that is, the group of instructions that have been in the GCT for the longest period of time.

Turning now to FIG. 1, a block diagram of a system 100 that includes an instruction sequencing unit (ISU) of an out-of-order (OoO) processor for providing coalesced GCT in an OoO processor is generally shown according to one or more embodiments of the present invention. The system 100 shown in FIG. 1 includes an instruction fetch unit/instruction decode unit (IFU/IDU) 106 that fetches and decodes a group of instructions for input to a setup block 108 which prepares the decoded instructions for input to a mapper 110 of the ISU. In accordance with one or more embodiments of the present invention, six instructions at a time from a thread can be fetched and decoded by the IFU/IDU 106. In accordance with one or more embodiments of the present invention, the six instructions sent to the setup block 108 can include six non-branch instructions, five non-branch instructions and one branch instruction, or four non-branch instructions and two branch instructions. In accordance with one or more embodiments of the present invention, the setup block 108 checks that sufficient resources such as entries in the issue queues, completion table, mappers and register files exist before transmitting the fetched instructions to these blocks in the ISU.

The mappers 110 shown in FIG. 1 map programmer instructions (e.g., logical register names) to physical resources of the processor (e.g., physical register addresses). A variety of mappers 110 are shown in FIG. 1 including a condition register (CR) mapper; a link/count (LNK/CNT) register mapper; an integer exception register (XER) mapper; a unified mapper (UMapper) for mapping general purpose registers (GPRs) and vector-scalar registers (VSRs); an architected mapper (ARCH Mapper) for mapping GPRs and VSRs; and, a floating point status and control register (FPSCR) mapper.

The output from the setup block 108 is also input to a global completion table (GCT) 112 for tracking all of the instructions currently in the ISU. The output from the setup block 108 is also input to a dispatch unit 114 for dispatching the instructions to an issue queue. The embodiment of the ISU shown in FIG. 1 includes a CR issue queue, CR ISQ 116, which receives and tracks instructions from the CR mapper and issues 120 them to instruction fetch unit (IFU) 124 to execute CR logical instructions and movement instructions. Also shown in FIG. 1 is a branch issue queue, Branch ISQ 118, which receives and tracks branch instructions and LNK/CNT physical addresses from the LNK/CNT mapper. Branch ISQ 118 can issue 122 an instruction to IFU 124 to redirect instruction fetching if a predicted branch address and/or direction was incorrect.

Instructions output from the dispatch logic and renamed registers from the LNK/CNT mapper, XER mapper, UMapper (GPR/VSR), ARCH Mapper (GPR/VSR), and FPSCR mapper are input to issue queue 102. As shown in FIG. 1, issue queue 102 tracks dispatched fixed point instructions (Fx), load instructions (L), store instructions (S), and vector-and-scaler unit (VSU) instructions. As shown in the embodiment of FIG. 1, issue queue 102 is broken up into two parts, ISQ0 1020 and ISQ1 1021, each portion holding N/2 instructions. When the processor is executing in ST mode, the issue queue 102 can be used as a single logical issue queue that contains both ISQ0 1020 and ISQ1 1021 to process all of the instructions (in this example all N instructions) of a single thread.

When the processor is executing in MT mode, ISQ0 1020 can be used to process N/2 instructions from a first thread and ISQ1 1021 is used to process N/2 instructions from a second thread ISQ1 1021.

As shown in FIG. 1, issue queue 102 issues instructions to execution units 104 which are split into two groups of execution units 1040 1041. Both groups of execution units 1040 1041 shown in FIG. 1 include a full fixed point execution unit (Full FX0, Full FX1); a load execution unit (LU0, LU1); a simple fixed point, store data, and store address execution unit (Simple FX0/STD0/STA0, Simple FX1/STD1/STA1); and a floating point, vector multimedia extension, decimal floating point, and store data execution unit (FP/VMX/DFP/STD0, FP/VMX/DFP/STD1). Collectively, the LU0, the Simple FX0/STD0/STA0, and the FP/VMX/DFP/STD0 form a load-store unit (LSU) 1042. Similarly, the LU1, the Simple FX1/STD1/STA1, and the FP/VMX/DFP/STD1 form a load-store unit (LSU) 1043.

As shown in FIG. 1, when the processor is executing in ST mode, the first group of execution units 1040 execute instructions issued from ISQ0 1020 and the second group of execution units 1041 execute instructions issued from ISQ1 1021. In alternate embodiments of the present invention when the processor is executing in ST mode, instructions issued from both ISQ0 1020 and ISQ1 1021 in issue queue 102 can be issued to execution units in any of the execution units 1040 in the first group of execution units 1040 and the second group of execution units 1041.

In accordance with one or more embodiments of the present invention, when the processor is executing in MT mode, the first group of execution units 1040 execute instructions of the first thread issued from ISQ0 1020 and the second group of execution units 1041 execute instructions of the second thread issued from ISQ1 1021.

The number of entries in the issue queue 102 and sizes of other elements (e.g., bus widths, queue sizes) shown in FIG. 1 are intended to be exemplary in nature as embodiments of the present invention can be implemented for issue queues and other elements of a variety of different sizes. In accordance with one or more embodiments of the present invention, the sizes are selectable, or programmable.

Figure 2:
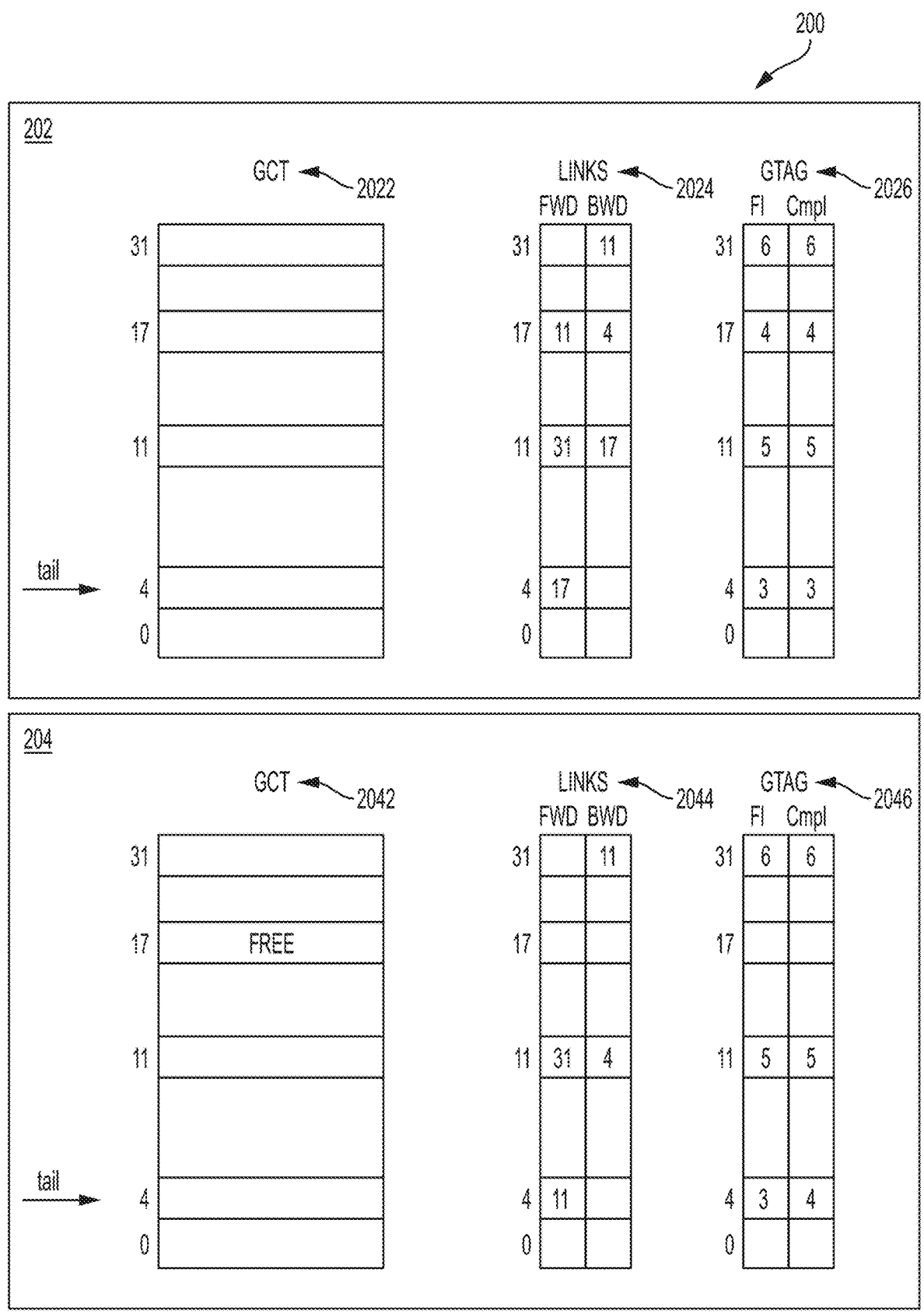
FIG. 2 depicts a block diagram of a GCT, links in the GCT, and group tags (GTAGs) for GCT entries for providing coalesced global completion table entries in the OoO processor in accordance with one or more embodiments of the present invention.

Turning now to FIG. 2, a block diagram 200 of a GCT, links to order entries in the GCT, and group tags (GTAGs) for identifying GCT entries is generally shown in accordance with one or more embodiments of the present invention. Block 202 depicts a GCT 2022, links table 2024, and GTAG table 2026 prior to merging entry "17" (associated with a younger group of instructions) into entry "4" (associated with an older group of instructions). Block 204 of FIG. 2 depicts a GCT 2042, links table 2044, and GTAG table 2046 after the contents of entry "17" of the GCT is merged into entry "4."

As described previously, a GCT 204 tracks in-flight instructions after dispatch and through completion. When a group of instructions is dispatched, the group is assigned a GTAG which corresponds to an entry in the GCT 204 and identifies the group of instructions. The GTAGs are assigned sequentially and are utilized by one or more embodiments described herein to track a dispatch order of the groups of in-flight instructions. Resources associated with in-flight instructions can use the GTAG to identify which group of instructions each resource is assigned to. When a group of instructions is completed, a completion GTAG can be broadcast so that resources associated with the completing group can be released and reused by new instructions.

In an OoO processor, instructions may be flushed before/instead of completing. Reasons to flush speculative instructions from the instruction pipeline include, but are not limited to: branch misprediction, load/store OoO execution hazard detection, execution of a context synchronizing instruction, and exception conditions. In accordance with one or more embodiments of the present invention, the GCT broadcasts flush group GTAGs for both full and partial group flushes so that resources associated with the flushed instructions can be released and reused by new instructions. For a partial group flush, the GTAG can be accompanied by a mask that indicates which instructions are being flushed.

As described previously, block 202 depicts a GCT 2022, links table 2024, and GTAG table 2026 prior to merging entry "17" (associated with a next younger group of instructions than entry "4") into entry "4" (associated with a next older group of instructions than entry "17"). For each entry in the GCT 2022, the links table 2024 stores forward links to immediately subsequent groups (younger groups) of in-flight instructions and backward links to immediately prior groups (older groups) of in-flight instructions. Also shown in block 202 of FIG. 2 is a GTAG table 2026 which includes, for each entry in the GCT 2022, a GTAG to be broadcast when the group is completed (column labeled "Cmpl") as well as a GTAG to be used when all or a subset of the group is flushed (column labeled "Fl").

As shown in block 202 of FIG. 2, the in-flight group of instructions at entry "4" in the GCT 2022 is the oldest group of in-flight instructions (it has no backward link) and the in-flight group of instructions at entry "31" in the GCT 2022 is the youngest group of in-flight instructions in the GCT 2022 (it has no forward link). The dispatch order of the groups of in-flight instructions shown in block 202 of FIG. 2, starting with the oldest entry in the GCT 2022 is the group of in-flight instructions at GCT entry "4" with a GTAG of "3", the group of in-flight instructions at GCT entry "17" with a GTAG of "4", the group of in-flight instructions at GCT entry "11" with a GTAG of "5", and the group of in-flight instructions at GCT entry "31" with a GTAG of "6."

Block 204 in FIG. 2 depicts a GCT 2042, link table 2044, and GTAG table 2046 after entry "17" (associated with a next younger group of instructions than entry "4") is merged into entry "4" (associated with a next older group of instruction than entry "17"). When the merge is complete, the merged entry "4" in the GCT 2042 includes completion information for the group at entry "17" (with a GTAG of "4") prior to the merge and for the group at entry "4" (with a GTAG of "3"). The completion information can be used to complete both groups of instructions once all of the instructions in the in-flight group associated with entry "4" prior to the merge have finished. The completion information can include, but is not limited to the total number of store operations in both groups of instructions; the total number of load operations in both groups of instructions, the total number of instruction in both groups of instructions, and the GTAG(s) for the merged group. As shown in block 204 of FIG. 2, entry "17" in the GCT 2042 is free, or deallocated, after the merge of entries "17" and "4." The dispatch order of the groups of in-flight instructions shown in block 204 of FIG. 2 (as indicated by links table 2044) starting with the oldest entry in the GCT 2024 is the merged group of in-flight instructions at GCT entry "4" with a GTAG of "3" for flushes and a GTAG of "4" for completions, the group of in-flight instructions at GCT entry "11" with a GTAG of "5", and the group of in-flight instructions at GCT entry "31" with a GTAG of "6."

The merged group of in-flight instructions at GCT entry "4" uses a different GTAG if the older group flushes than rather than completes. In accordance with one or more embodiments, when a merged instruction completes any resources associated with a GTAG of the younger group of instructions that was merged or lower (i.e., older instructions) are released. This is contrasted with a flush which causes any resources associated with a GTAG of the older group of instructions that was merged or higher (i.e., younger instructions) to be released.

The GCT 2022 shown in block 202 of FIG. 2 includes thirty-two entries that can be dynamically shared by all active threads. In a single-thread (ST) mode, each GCT entry corresponds to one group of instructions. In a multi-thread (MT) mode (e.g. simultaneous MT or "SMT") each GCT entry can contain up to two dispatch groups, both from the same thread. Each entry in the GCT 2022 contains finish bits for each instruction in the group contained in the entry. Any number of entries (e.g., 16, 64, 100, 128, and 256) can be stored in the GCT 2022 and thirty-two is intended to be a non-limiting example number of entries for discussion purposes.

Figure 3:
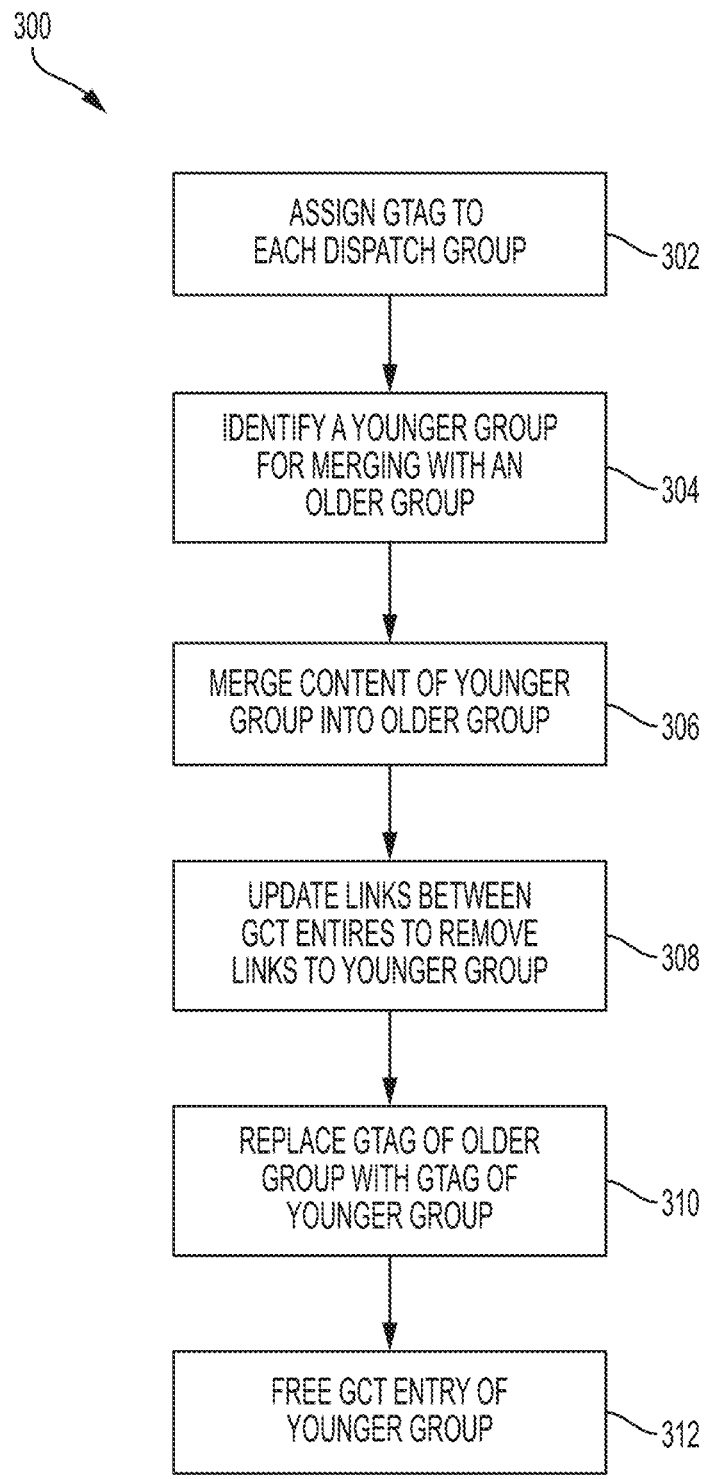
FIG. 3 depicts a flow diagram of coalescing GCT entries in an OoO processor in accordance with one or more embodiments of the present invention.

Turning now to FIG. 3, a flow diagram 300 of coalescing GCT entries in an OoO processor is generally shown in accordance with one or more embodiments of the present invention. At block 302, a GTAG is assigned to each group of dispatched instructions in a sequential order to assist in tracking the dispatch order of the groups of dispatched instructions that are in-flight. At block 304, a younger group (e.g., dispatched at time T+1) of in-flight instructions is identified for merging with an older group (e.g., dispatched at time T) of in-flight instructions. The identifying can include detecting that all instructions in the younger group have a status of finished. The younger group can be associated with a first allocated entry in a GCT, and the older group which was dispatched immediately prior to the younger group (they are contiguous) can be associated with a second allocated entry in the GCT.

At block 306, the content of the entry in the GCT associated with the younger group is merged into the content of the entry in the GCT associated with the older, unfinished group of instructions to create a merged allocated entry that includes completion information for both groups of in-flight instructions. At block, 308, the backward and forward links between GCT entries are updated to remove links to the younger group. At block 310, the GTAG of the older group is replaced with the GTAG of the younger group for completion of the merged older group. At block 312, the GCT entry associated with the younger group is deallocated and available for use by a new group of instructions.

Figure 4:
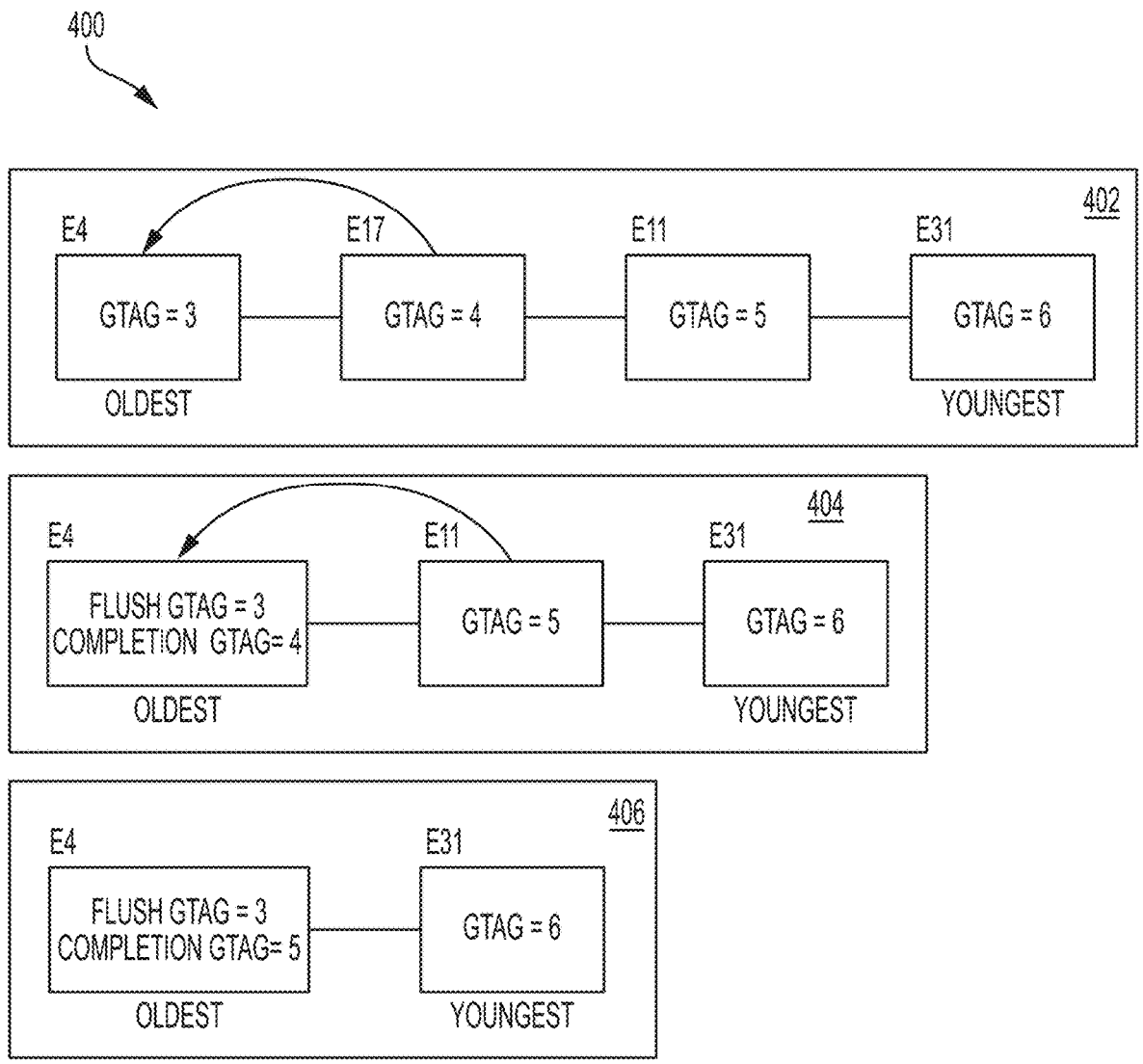
FIG. 4 depicts a block diagram of coalescing GCT entries in an OoO processor in accordance with one or more embodiments of the present invention.

Turning now to FIG. 4, a block diagram 400 of coalescing GCT entries in an OoO processor is generally shown in accordance with one or more embodiments of the present invention. Block 402 shows a linked list which is one option for logically representing the GCT 2022, links table 2024, and GTAG table 2026 shown in FIG. 2. Block 404 shows a linked list that represents the GCT 2042, links table 2044, and GTAG table 2046 shown in FIG. 2 after GCT entries "17" and "4" are merged into a single merged entry "4." As shown in block 406 FIG. 4, the merging of entries of younger groups into older groups can continue with the GCT entry "11" being merged into merged entry "4" based at least in part on detecting that all of the instructions in the group of instructions associated with GCT entry "11" have a status of finished. After the merging is complete, GCT entry "11" can be reused and associated with a new group of instructions.

Figure 5:
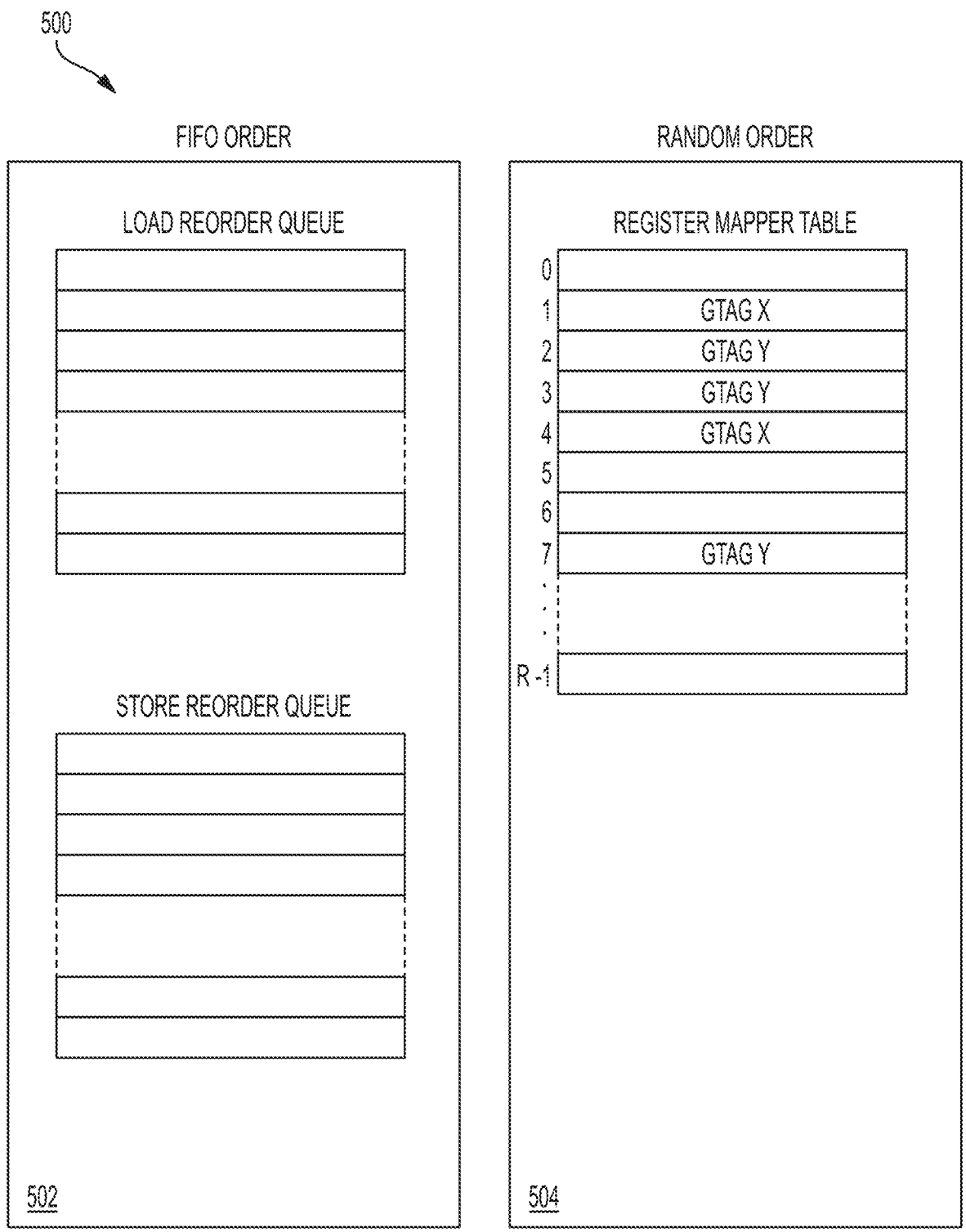
FIG. 5 depicts a block diagram of resources utilized by groups of instructions in an OoO processor in accordance with one or more embodiments of the present invention.

Turning now to FIG. 5, a block diagram 500 of example resources utilized by groups of instructions in an OoO processor is generally shown in accordance with one or more embodiments of the present invention. FIG. 5 includes first-in-first-out (FIFO) order resources 502 that are accessed in a sequential order based on the dispatch order of instructions and random order resources 504 that are assigned to groups of instructions in a random order. The load reorder queue (LRQ) and store reorder queue (SRQ) are examples of FIFO order resources 502. In accordance with one or more embodiments of the present invention, the LRQ is characterized by in-order (dispatch order) allocation and de-allocation, the tail pointers (pointing to the oldest entries) are changed when a group of instructions completes, and the LRQ is partitioned per thread. For example, if a group of instructions has two load instructions and the group completes, the tail pointer of the LRQ is advanced by two entries in the queue. In accordance with one or more embodiments of the present invention, when a younger instruction group is merged into the next older instruction group, the number of loads in the younger instruction group is added to the number of loads in the older instruction group. When the merged group completes, the LRQ tail pointer is adjusted to account for loads in both instruction groups. The SRQ is similar to the LRQ, however deallocation may occur after store drains. Another resource that can be a FIFO order resource 502 is an effective address table (EAT) that is characterized by in-order allocation and de-allocation with the tail pointers being changed for completing threads.

The register mapper table shown in FIG. 5 is an example of a random order resource 504. The register mapper table can be generated by the mapper 110 shown in FIG. 1 to correlate instruction groups (identified by GTAGs) with physical registers (one entry for each physical register). As shown in the register mapper table in FIG. 5, there are "R" registers, and the instruction group associated with a GTAG of "GTAG X" is using physical registers "1" and "4", and the instruction group associated with a GTAG of "GTAG Y" is using physical registers "2", "3", and "6." When a group of instructions completes, and the GTAG is broadcast, all physical registers that are associated with GTAGs that are the same or smaller (i.e., older instruction groups) than the broadcast GTAG are either marked as containing the architected state or released for use by new instruction groups. When a group of instructions is flushed, and the GTAG is broadcast, physical registers that are associated with GTAGs that are the larger (i.e., younger instruction groups) than the broadcast GTAG can be released for use by new instruction groups. Thus, the register mapper table can release entries for use by additional instructions based at least in part on a flush or completion indicator being received, for example, from a GCT.

Figure 6:
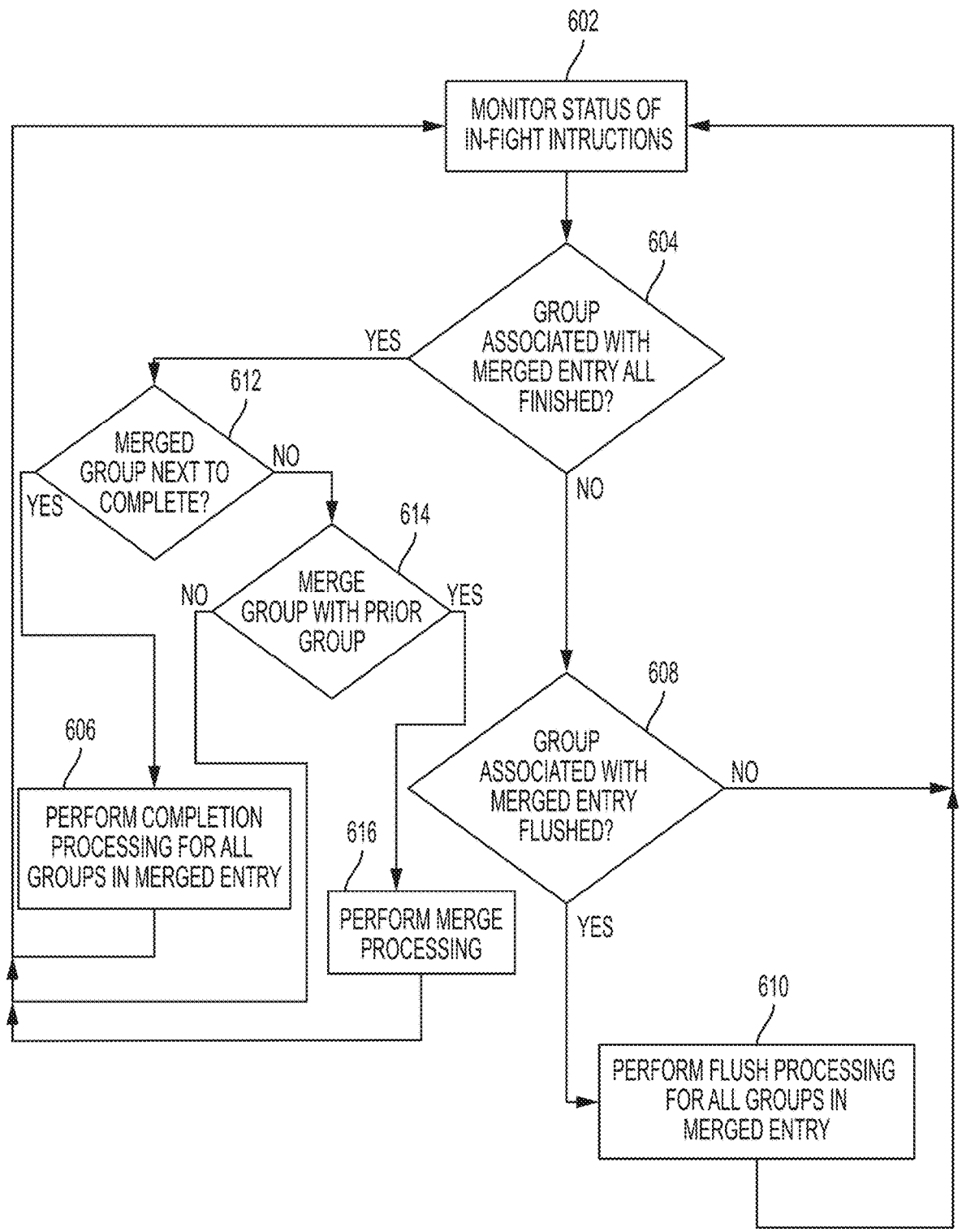
FIG. 6 depicts a flow diagram for completing coalesced GCT entries in an OoO processor in accordance with one or more embodiments of the present invention.

Turning now to FIG. 6, a flow diagram 600 for completing coalesced GCT entries in an OoO processor is generally shown in accordance with one or more embodiments of the present invention. One or more embodiments of the present invention allow a single completion to scan/complete two or more groups of instructions. One or more embodiments of the present invention handle the freeing up of resources when a GCT entry that reflects a combination of two or more coalesced GCT entries completes.

The status of instructions in groups of in-flight instructions is monitored at block 602 of the process flow shown in FIG. 6. If it is determined at block 604 that all of the instructions in a group associated with a merged entry in the GCT are finished, then processing continues at block 612, where it is determined whether the merged block with all instructions finished is eligible to complete, for example, it is the oldest group. If so, then processing continues at block 606 where completion processing is performed for all groups in the merged entry. In accordance with one or more embodiments of the present invention, the completion processing can include requesting release of and releasing resources utilized by all of the groups of instructions in the merged entry. As described previously, the resources can include a first-in-first-out (FIFO) resource and the requesting release can include a request to move a pointer to a specified location in the FIFO resource. Also as described previously, the resources can include a random order resource and the requesting release can include a request to remove entries associated with particular tags (e.g., GTAGs less than a specified value). If the merged group is not eligible to complete, for example, because an older group has not yet completed, a determination is made whether the present merged group can be merged with an older group at block 614. If so, the merging of groups is carried out at block 616 in the manner described previously. Processing continues for the newly merged or previously merged and uncompleted group at block 602 with monitoring the status of in-flight instructions.

If it is determined at block 604 that all of the instructions in a group associated with a merged entry in GCT are not finished, then processing continues at block 608 where it is determined whether all or a subset of instruction in a group associated with a merged entry should be flushed (e.g., the completion logic receives and indication that a flush is needed from the branch resolution or exception logic along with a flush gtag and instruction mask). If it is determined at block 608 that instructions in a group associated with a merged entry in the GCT should be flushed, then processing continues at block 610 where flush processing is performed for all groups in the merged entry. If it is determined at block 608 that instructions in a group associated with a merged entry in the GCT should not be flushed, then processing continues at block 602 with monitoring the status of in-flight instructions.

The processing shown in FIG. 6 performs fast completion by allowing multiple groups in a coalesced GCT entry to be completed at the same rate as a single group in an un-coalesced GCT entry. For example, a design that can complete one group per thread in each cycle might complete ten groups per thread in just one cycle to return resources back (and unblock dispatch) if the completing GCT entry represents merged groups. In addition, merging GCT entries prior to completion provides the benefit of freeing the GCT entry that was occupied by the younger merged group.

Figure 7:
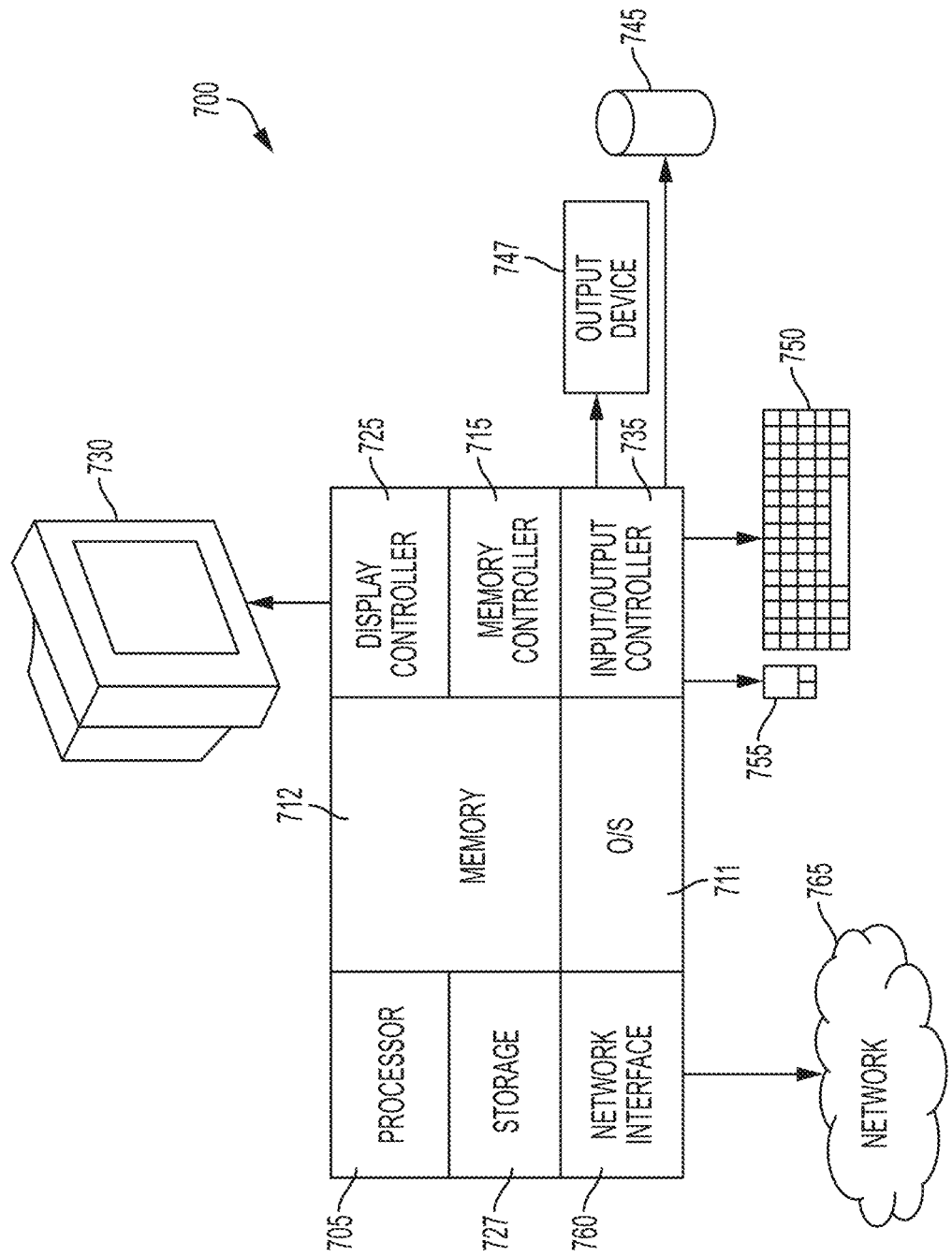
FIG. 7 depicts a block diagram of a computer system for implementing some or all aspects of coalesced GCT entries in an OoO processor in accordance with one or more embodiments of the present invention.

Turning now to FIG. 7, a block diagram of a computer system for implementing some or all aspects of providing coalesced GCT entries in an OoO processor is generally shown in accordance with one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 700, such as a mobile device, personal computer, workstation, minicomputer, or mainframe computer.

In an exemplary embodiment, as shown in FIG. 7, the computer system 700 includes a processor 705, memory 712 coupled to a memory controller 715, and one or more input devices 745 and/or output devices 747, such as peripherals, that are communicatively coupled via a local I/O controller 735. These devices 747 and 745 may include, for example, a printer, a scanner, a microphone, and the like. A conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 747, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 712. The processor 705 may be a custom made or commercially available processor, a central processing unit (CPU), an auxiliary processor among several processors associated with the computer system 700, a semiconductor based microprocessor (in the form of a microchip or chip set), a microprocessor, or other device for executing instructions. The processor 705 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 712 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 712 may incorporate electronic, magnetic, optical, or other types of storage media. Note that the memory 712 may have a distributed architecture, where various components are situated remote from one another but may be accessed by the processor 705.

The instructions in memory 712 may include one or more separate programs, each of which comprises an ordered listing of executable instructions for implementing logical functions. In the example of FIG. 7, the instructions in the memory 712 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 727, which may be a storage device such as a hard disk drive or solid state drive. The stored instructions in memory 712 or in storage 727 may include those enabling the processor 705 to execute one or more aspects of the dispatch systems and methods of this disclosure.

The computer system 700 may further include a display controller 725 coupled to a display 730. In an exemplary embodiment, the computer system 700 may further include a network interface 760 for coupling to a network 765. The network 765 may be an IP-based network for communication between the computer system 700 and an external server, client and the like via a broadband connection. The network 765 transmits and receives data between the computer system 700 and external systems. In an exemplary embodiment, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing coalesced GCT entries in an OoO processor can be embodied, in whole or in part, in computer program products or in computer systems 700, such as that illustrated in FIG. 7.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    detecting, in an instruction sequencing unit (ISU) of an out-of-order (OoO) processor, that all instructions in a first group of in-flight instructions have a status of finished, wherein
        the first group of in-flight instructions is associated with a first allocated entry in a global completion table (GCT) that tracks a dispatch order and status of groups of in-flight instructions,
        the GCT comprises a plurality of allocated entries including the first allocated entry and a second allocated entry, and
        a second group of in-flight instructions dispatched immediately prior to the first group is associated with the second allocated entry in the GCT; and
    based at least in part on the detecting, merging the first allocated entry into the second allocated entry to create a merged second allocated entry that includes completion information for both the first group of in-flight instructions and the second group of in-flight instructions.

2. The computer-implemented method of claim 1, wherein the merging comprises updating the second allocated entry to reflect:
    a number of valid instructions in the first allocated entry,
    a number of store operations in the first group of in-flight instructions; and
    a number of load operations in the first group of in-flight instructions.

3. The computer-implemented method of claim 1, wherein a group tag is assigned to each allocated entry in the GCT to indicate the dispatch order of the groups of in-flight instructions.

4. The computer-implemented method of claim 3, wherein the merging comprises updating the second allocated entry to reflect the group tag assigned to the first allocated entry and the group tag assigned to the second allocated entry.

5. The computer-implemented method of claim 3, wherein the merging comprises updating the second allocated entry to reflect the group tag assigned to the second allocated entry and a number of allocated entries that have been merged into the second allocated entry.

6. The computer-implemented method of claim 1, wherein the dispatch order of the groups of dispatched instructions is tracked by the GCT using a linked list.

7. The computer implemented method of claim 1, further comprising, subsequent to the merging:
    detecting, in the ISU of the OoO processor, that all instructions in a third group of in-flight instructions have a status of finished, wherein
        the third group of in-flight instructions is associated with a third allocated entry in the GCT,
        the third group of in-flight instructions were dispatched immediately after to the first group of in-flight instructions; and
    based at least in part on the detecting, merging the third allocated entry into the single merged second allocated entry to create an updated single merged second allocated entry that includes completion information for both the first group of in-flight instructions, the second group of in-flight instructions, and the third group of in-flight instructions; and
    deallocating the third allocated entry in the GCT for use by a new group of in-flight instructions.

8. A system comprising:
a memory having computer readable instructions; and
one or more processors for executing the computer readable instructions, the computer readable instructions controlling the one or more processors to perform operations comprising:
   detecting, in an instruction sequencing unit (ISU) of an out-of-order (OoO) processor, that all instructions in a first group of in-flight instructions have a status of finished, wherein
   the first group of in-flight instructions is associated with a first allocated entry in a global completion table (GCT) that tracks a dispatch order and status of groups of in-flight instructions,
   the GCT comprises a plurality of allocated entries including the first allocated entry and a second allocated entry, and
   a second group of in-flight instructions dispatched immediately prior to the first group is associated with the second allocated entry in the GCT; and
   based at least in part on the detecting, merging the first allocated entry into the second allocated entry to create a merged second allocated entry that includes completion information for both the first group of in-flight instructions and the second group of in-flight instructions.

9. The system of claim 8, wherein the merging comprises updating the second allocated entry to reflect:
   a number of valid instructions in the first allocated entry,
   a number of store operations in the first group of in-flight instructions; and
   a number of load operations in the first group of in-flight instructions.

10. The system of claim 8, wherein a group tag is assigned to each allocated entry in the GCT to indicate the dispatch order of the groups of in-flight instructions.

11. The system of claim 10, wherein the merging comprises updating the second allocated entry to reflect the group tag assigned to the first allocated entry and the group tag assigned to the second allocated entry.

12. The system of claim 10, wherein the merging comprises updating the second allocated entry to reflect the group tag assigned to the second allocated entry and a number allocated entries that have been merged into the second allocated entry.

13. The system of claim 8, wherein the dispatch order of the groups of dispatched instructions is tracked by the GCT using a linked list.

14. The system of claim 8, wherein the operations further comprise, subsequent to the merging:
   detecting, in the ISU of the OoO processor, that all instructions in a third group of in-flight instructions have a status of finished, wherein
   the third group of in-flight instructions is associated with a third allocated entry in the GCT,
   the third group of in-flight instructions were dispatched immediately prior to the first group of in-flight instructions; and
   based at least in part on the detecting, merging the third allocated entry into the single merged second allocated entry to create an updated single merged second allocated entry that includes completion information for both the first group of in-flight instructions, the second group of in-flight instructions, and the third group of in-flight instructions; and
   deallocating the third allocated entry in the GCT for use by a new group of in-flight instructions.

15. A computer program product comprising a computer readable storage medium having program instructions embodied therewith, the program instructions executable by a processor to cause the processor to perform operations comprising:
   detecting, in an instruction sequencing unit (ISU) of an out-of-order (OoO) processor, that all instructions in a first group of in-flight instructions have a status of finished, wherein
   the first group of in-flight instructions is associated with a first allocated entry in a global completion table (GCT) that tracks a dispatch order and status of groups of in-flight instructions,
   the GCT comprises a plurality of allocated entries including the first allocated entry and a second allocated entry, and
   a second group of in-flight instructions dispatched immediately prior to the first group is associated with the second allocated entry in the GCT; and
   based at least in part on the detecting, merging the first allocated entry into the second allocated entry to create a merged second allocated entry that includes completion information for both the first group of in-flight instructions and the second group of in-flight instructions.

16. The computer program product of claim 15, wherein the merging comprises updating the second allocated entry to reflect:
   a number of valid instructions in the first allocated entry,
   a number of store operations in the first group of in-flight instructions; and
   a number of load operations in the first group of in-flight instructions.

17. The computer program product of claim 15, wherein the dispatch order of the groups of dispatched instructions is tracked by the GCT using a linked list.

18. The computer program product of claim 15, wherein a group tag is assigned to each allocated entry in the GCT to indicate the dispatch order of the groups of in-flight instructions.

19. The computer program product of claim 18, wherein the merging comprises updating the second allocated entry to reflect the group tag assigned to the first allocated entry and the group tag assigned to the second allocated entry.

20. The computer program product of claim 15, wherein the operations further comprise, subsequent to the merging:
   detecting, in the ISU of the OoO processor, that all instructions in a third group of in-flight instructions have a status of finished, wherein
   the third group of in-flight instructions is associated with a third allocated entry in the GCT,
   the third group of in-flight instructions were dispatched immediately prior to the first group of in-flight instructions; and
   based at least in part on the detecting, merging the third allocated entry into the single merged second allocated entry to create an updated single merged second allocated entry that includes completion information for both the first group of in-flight instructions, the second group of in-flight instructions, and the third group of in-flight instructions; and
   deallocating the third allocated entry in the GCT for use by a new group of in-flight instructions.

* * * * *